United States Patent [19]

Bainard et al.

[11] E Patent Number: Re. 33,029

[45] Reissued Date of Patent: Aug. 22, 1989

[54] MOLDED LIP SEAL WITH POLYTETRAFLUOROETHYLENE LINER AND METHOD FOR MAKING SAME

[75] Inventors: Dean R. Bainard, Clover, S.C.; Dennis N. Denton, Besemer, N.C.

[73] Assignee: Garlock, Inc., Longview, Tex.

[21] Appl. No.: 734,255

[22] Filed: May 15, 1985

Related U.S. Patent Documents

Reissue of:

[64] Patent No.: 4,239,243
Issued: Dec. 16, 1980
Appl. No.: 27,003
Filed: Apr. 4, 1979

U.S. Applications:

[63] Continuation of Ser. No. 571,154, Jan. 18, 1984, abandoned, which is a continuation of Ser. No. 345,735, Feb. 4, 1982, abandoned.

[51] Int. Cl.[4] ..... F16J 15/32

[52] U.S. Cl. ..... 277/153; 277/223; 277/228; 277/DIG. 6

[58] Field of Search ..... 277/152, 153, 134, 223, 277/228, 233, DIG. 6, 227, 229; 29/527.1; 264/248, 260, 271, 275; 156/245

[56] References Cited

U.S. PATENT DOCUMENTS

| | | | |
|---|---|---|---|
| 2,717,025 | 9/1955 | Jelinek | 277/229 |
| 2,736,585 | 2/1956 | Riesing | 277/223 X |
| 2,804,324 | 8/1957 | Stallings | 277/223 X |
| 2,804,325 | 8/1957 | Riesing | 277/223 X |
| 2,868,575 | 1/1959 | Hawxhurst | 277/229 X |
| 2,932,535 | 4/1960 | Peickii et al. | 277/227 X |
| 2,998,397 | 8/1961 | Riesing | 277/DIG. 6 |
| 3,276,115 | 10/1966 | Hansz | 29/527.1 X |
| 3,493,645 | 2/1970 | Sanderson et al. | 277/228 X |
| 3,495,843 | 2/1970 | Andersen et al. | 277/153 X |
| 3,923,315 | 12/1975 | Hadaway | 277/134 |
| 3,929,341 | 12/1975 | Clark | 277/DIG. 6 X |
| 3,973,781 | 8/1976 | Grörich | 277/153 X |
| 4,066,269 | 1/1978 | Linne | 277/228 |
| 4,159,298 | 6/1979 | Bainard | 29/527.1 X |

FOREIGN PATENT DOCUMENTS

| | | | |
|---|---|---|---|
| 2218376 | 11/1972 | Fed. Rep. of Germany | 277/228 |
| 46-23681 | 7/1971 | Japan | |

*Primary Examiner*—Robert S. Ward
*Attorney, Agent, or Firm*—Sixbey, Friedman, Leedom & Ferguson

[57] ABSTRACT

A shaft seal (and method for making the same) of the type having an annular elastomeric body, a molded lip, and the molded lip having a liner of sintered polytetrafluoroethylene bonded thereto. The elastomer is molded simultaneously with the polytetrafluoroethylene liner being formed and bonded to the elastomer. The method for making the seal employs the same mold used to make common, molded lip elastomeric seals.

22 Claims, 2 Drawing Sheets

FIG. 1
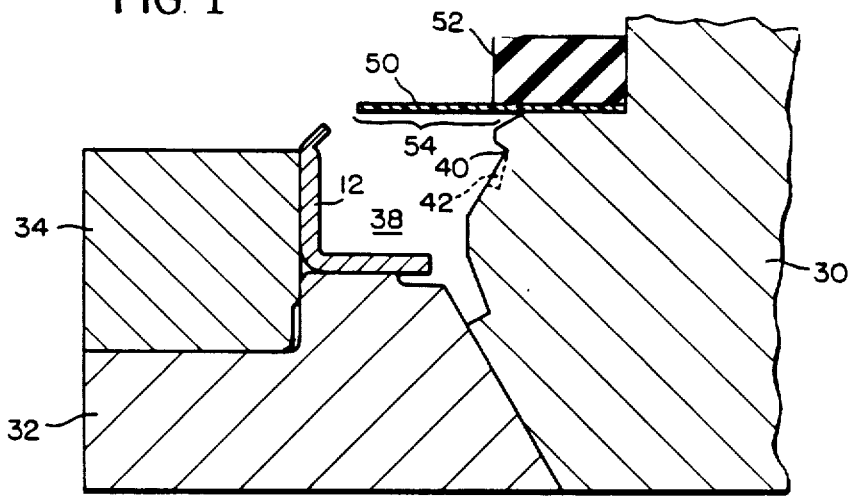
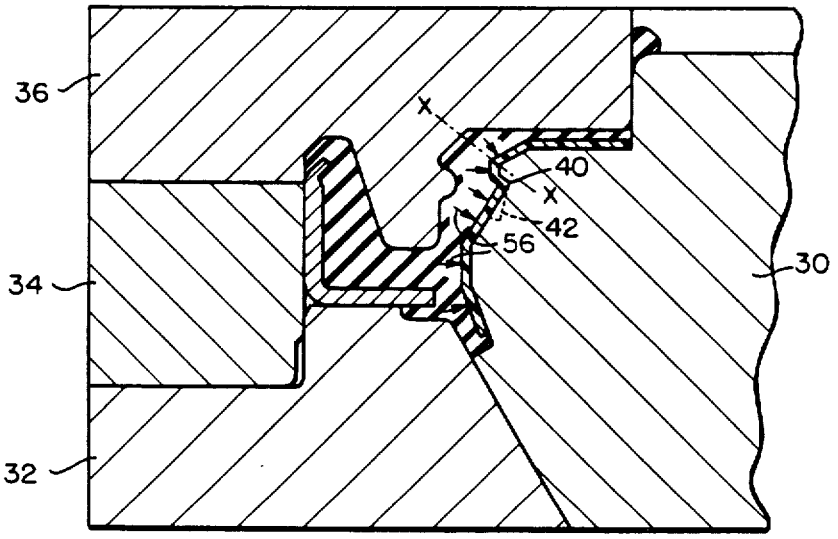
FIG. 2

MOLDED LIP SEAL WITH POLYTETRAFLUOROETHYLENE LINER AND METHOD FOR MAKING SAME

Matter enclosed in heavy brackets [ ] appears in the original patent but forms no part of this reissue specification; matter printed in italics indicates the additions made by reissue.

[This is a division of application Ser. No. 746,392, filed Dec. 1, 1976, U.S. Pat. No. 4,171,561, issued Oct. 23, 1979.]

*This application is a continuation of application Ser. No. 571,154 filed Jan. 18, 1984, now abandoned, which is a continuation of application Ser. No. 345,735, filed Feb. 4, 1982, now abandoned, which is a reissue application for U.S. Pat. No. 4,239,243 which issued on Dec. 16, 1980 on application Ser. No. 27,003. Application Ser. No. 27,003 was filed on Apr. 4, 1979 and was a division of application Ser. No. 746,392 filed Dec. 1, 1976, U.S. Pat. No. 4,171,561, issued Oct. 23, 1979.*

BACKGROUND OF THE INVENTION

1. Field of the Invention

This invention relates to shaft seals and in particular to elastomeric molded lip shaft seals having a polytetrafluoroethylene wear surface.

2. Description of the Prior Art

Polytetrafluoroethylene seals are presently being manufactured for severe sealing applications, however, these polytetrafluoroethylene seals require new mold tooling in order to be manufactured. Some of the advantages of the polytetrafluoroethylene seal are obtained by applying a polytetrafluoroethylene coating to molded elastomeric seals. For example, it is also known to form a molded elastomeric shaft seal and then to coat the sealing element with a thin layer of polytetrafluoroethylene as by spraying or dipping (see U.S. Pat. No. 2,932,535). A process for allegedly forming a multiple material seal having an inside made of a less expensive material and a liner of Viton or allegedly Teflon is described in U.S. Pat. No. 3,493,645. It is also known to form an annular shaft seal of the type having a trimmed lip by using a standard mold and placing a polytetrafluoroethylene ring in the mold with a pre-form of elastomer on top of the ring, such that when the mold closes the elastomeric material forms the polytetrafluoroethylene ring into a liner. After the molded seal is removed from the mold cavity it is trimmed at a critical location to produce a trimmed lip at a predetermined point; the polytetrafluoroethylene liner will therefore exist bonded to the molded elastomer from the contact point of the sealing lip axially outwardly in one direction only away from the lip. A method for making shaft seals having a trimmed lip (but without a polytetrafluoroethylene liner) is shown generally in U.S. Pat. No. 3,276,115 wherein the trimming is done along line X—X in FIG. 6 thereof.

It is an object of the present invention to provide an elastomeric shaft seal of the molded lip type and a method for making such seals using only the same tooling used in making common molded lip elastomeric seals.

SUMMARY OF THE INVENTION

An annular molded elastomeric shaft seal of the molded lip type (and method for making the same) having a bonded liner of sintered polytetrafluoroethylene formed from a ring of sintered polytetrafluoroethylene, the molding, forming, and bonding all being done simultaneously using a standard mold of the type used to mold a common elastomeric molded lip seal.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIGS. 1 and 2 are partial cross-sectional views through a mold showing the method of the present invention.

DETAILED DESCRIPTION OF THE PREFERRED EMBODIMENT

Figure 3:
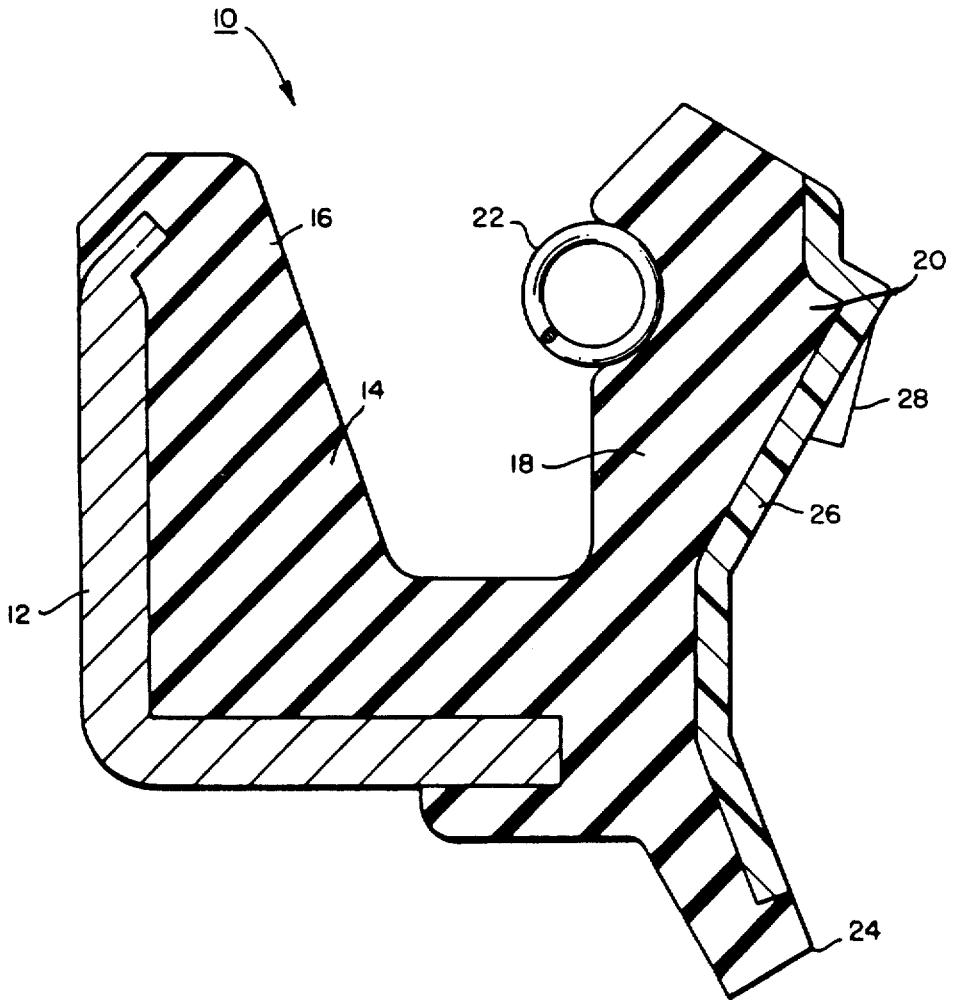
FIG. 3 is a partial cross-sectional view of a molded lip seal with a polytetrafluoroethylene liner according to the present invention.

With reference now to the drawings, FIGS. 1 and 2 show the method of the present invention and FIG. 3 shows a seal in accordance with the present invention. Referring first to the seal of the present invention, FIG. 3 shows a shaft seal 10 of the type having a molded lip 20 and a liner 26 of sintered polytetrafluoroethylene. These are the basic features of a seal according to this invention; thus, while the preferred seal is shown, the present invention is not limited thereto but encompasses all molded lip seals.

The seal 10 also comprises an annular metal shell 12 to which a molded elastomeric body 14 is bonded. The elastomeric body 14 includes a heel portion 16, a flexible portion 18, and an auxiliary or dust lip 24 and carrys a garter spring 22. The liner 26 can have hydrodynamic pumping elements 28 of any known shape, size or configuration, if desired. The pumping elements 28 are formed on the liner 26 during the molding process of the present invention, as described below.

The method of the present invention will now be described with reference to FIGS. 1 and 2 showing the molding technique of the present invention. FIGS. 1 and 2 show a standard mold for a conventional elastomeric molded lip shaft seal including a mold core 30, a lower die member 32, a centering ring 34 and a moveable upper die member 36. The mold is shown in its open position in FIG. 1 and in its closed position in FIG. 2. The mold defines a mold cavity 38 having a molded-lip groove 40 for forming the molded lip of the seal 10. Adjacent the molded-lip groove 40, one or more recesses 42 (one of which appears in dotted line in FIGS. 1 and 2) can be provided if desired, for forming hydrodynamic pumping elements 28.

In the process of the present invention, a ring or washer 50 of sintered polytetrafluoroethylene is placed on the mold core 30 as shown in FIG. 1 and a pre-form 52 of elastomeric material is placed on top of the ring 50. The ring 50 includes a portion 54 that extends radially out into the cavity 38 a sufficient distance such that the portion 54 will extend past the molded-lip groove 40 when the mold is closed and the ring 50 is formed into the liner 26. When the mold is closed, as shown in FIG. 2, the upper die member 36 is forced to move downwardly by a standard press causing the elastomer in the pre-form 52 to flow down into the cavity 38 behind the ring 50, causing the ring 50 to move down and against the mold core 30 under the hydraulic pressure (illustrated by the arrows 56 in FIG. 2) exerted thereon by the flowing elastomer. It is noted that the polytetrafluoroethylene ring 50 is "formed" as contrasted to the elastomer which "flows" under pressure. The sintered polytetrafluoroethylene of the ring 50 will not flow (although it may stretch slightly). The hydraulic pressure forms the ring 50 into the liner 26 and forces a portion of the ring 50 into the groove 40 to form the molded lip 20. The excess elastomer and liner material are removed by trimming along line X—X in FIG. 2. The elastomer is molded and simultaneously therewith the polytetrafluoroethylene liner is formed and bonded to the elastomer. The mold is then opened, the seal 10 is removed, and the process is repeated.

As will be understood from the above description, the shaft seal 10 can be manufactured utilizing the same identical tooling that is used for making common elastomeric type seals (such as for example, the seal of FIG. 3 but without the liner 26). The present invention can be used to make any seal of the type having a molded lip, for example, whether or not the lip is on the I.D. or the O.D. or it is a wafer seal. While the polytetrafluoroethylene liner 26 preferably covers that portion of the elastomer shown in FIG. 2, such is not essential, however, the liner should cover the molded lip 20 on each axial side of the lip to a distance of at least about twice the thickness of the ring 50. The thickness of the ring 50 used in the present invention is from about 0.010 inch to 0.050 inch, and is preferably between 0.015 and 0.030 inch thick. Thus, if the ring has a thickness of about 0.030 inch, the liner 26 should extend axially at least 0.060 inch on each side of the lip 20. The ring 50 can be treated as known in the art to aid in bonding it to the elastomer, such as by chemical etch and cement if desired. As stated above, the present invention is applicable to any shape or design of a shaft seal having a molded lip and is not limited to particular designs shown in FIGS. 1–3. For example, the metal shell 12 is not essential to the present invention nor are the hydrodynamic pumping elements 28, although they can be formed, if desired, using the same tooling recesses 42 as would be used for producing a common molded elastomeric seal without a polytetrafluoroethylene liner. The thickness of the liner 26 according to the present invention is closely controlled and is very uniform. This is an advantage especially in high speed and in dry applications in which prior seals having a polytetrafluoroethylene coating of varying thickness would fail due to failure at the thinnest areas of the coating. The term "liner" as used in the present invention is hereby defined to mean a separate, integral element bonded to the elastomer backing, in contrast to a thin, sprayed-on or dipped-on coating, for example. In addition, as will be understood by those skilled in the art, the term "form" is hereby defined for use in the present specification and claims to mean bent and reshaped (and to exclude "flowing") as is the case with the sintered polytetrafluoroethylene ring used in this invention, in contrast to the flowing of the elastomer pre-form 52.

The invention has been described in detail with particular reference to the preferred embodiments thereof, but it will be understood that variations and modifications can be effected within the spirit and scope of the invention as described hereinabove and as defined in the appended claims.

We claim:

1. A shaft seal *of the molded lip type* comprising an annular elastomeric body having a molded *sealing* lip, and said molded *sealing* lip having bonded thereto a hydraulically formed linef of uniform thickness of sintered polytetrafluoroethylene, *said liner having been shaped by deformation of a portion thereof into a lip-shaped groove or recess.*

2. The shaft seal according to claim 1 wherein said liner covers said body for at least 0.060 inch on each axial side of said molded lip.

3. The shaft seal according to claim 1 including a plurality of hydrodynamic pumping elements formed on a shaft-engaging surface of said liner.

4. The shaft seal according to claim 1 wherein said liner has a thickness in the range of from about 0.010–0.050 inch.

5. A shaft seal *of the molded lip type* comprising an annular metal shell, an annular elastomeric body having a molded *sealing* lip, said elastomeric body having an annular heel portion and an annular flex portion extending axially inwardly from a radially inner portion of said heel portion, said elastomeric body being generally U-shaped in radial cross-section, with the opening of the U facing axially inwardly, said heel portion having a radially outer, axially extending surface bonded to said shell, said molded *sealing* lip having bonded thereto a hydraulically formed liner of uniform thickness of sintered polytetrafluoroethylene, said body being molded simultaneously with said liner being hydraulically formed from a ring of sintered polytetrafluoroethylene and bonded to said elastomeric body, and a plurality of hydraulically formed hydrodynamic pumping elements on a shaft-engaging surface of said liner and formed simultaneously with said liner being formed.

6. The shaft seal according to claim 5 wherein said liner covers said body for at least 0.060 inch on each axial side of said molded lip.

7. The shaft seal according to claim 5 wherein said liner has a uniform thickness in the range of from about 0.010–0.050 inch.

8. The shaft seal according to claim 1 wherein said liner has an axially outer distal end having said uniform thickness and terminating axially inwardly of the axially outer end of said elastomeric body.

9. The shaft seal according to claim 5 wherein said liner has an axially outer distal end having said uniform thickness and terminating axially inwardly of the axially outer end of said elastomeric body.

10. The shaft seal according to claim 5 including an annular garter spring in contact with a radially outer surface of said flex portion for urging said flex portion radially inwardly.

*11. A shaft seal comprising an annular metal shell, an annular elastomeric body having an annular heel portion bonded to said shell and having an annular flex portion extending axially inwardly from a radially inner portion of said heel portion, said flex portion having bonded to the radially inner surface thereof a hydraulically formed liner of uniform thickness of sintered polytetrafluoroethylene, said liner having a shaft engaging surface, said body being molded simultaneously with said liner being hydraulically formed and bonded to said body, and said liner including at least one hydraulically formed radially inwardly extending ridge on said shaft engaging surface, said ridge being hydraulically formed simultaneously with said liner being formed and with said body being molded.*

*12. The shaft seal according to claim 11 wherein said shaft seal is of the molded lip type and includes a molded lip and wherein said at least one ridge includes a ridge*

*bonded to and formed over said molded lip so as to extend on each axial side of said molded lip.*

*13. The shaft seal according to claim 12 wherein said liner covers said body for at least 0.060 inch on each axial side of said molded lip.*

*14. The shaft seal according to claim 11 wherein said at least one ridge is a hydrodynamic pumping element.*

*15. The shaft seal according to claim 14 wherein said at least one ridge includes a plurality of hydrodynamic pumping elements.*

*16. The shaft seal according to claim 14 wherein said liner has a thickness in the range of from about 0.010–0.050 inch.*

*17. A shaft seal comprising an annular metal shell, an annular elastomeric body having an annular heel portion bonded to said shell and having an annular flex portion extending axially inwardly from a radially inner portion of said heel portion, said flex portion having bonded to the radially inner surface thereof a hydraulically formed liner of uniform thickness of sintered polytetrafluoroethylene, said liner having a shaft engaging surface, said body being molded simultaneously with said liner being hydraulically formed and bonded to said body, said flex portion having at least one molded, radially inwardly extending projection formed on the radially inner surface thereof and said liner including at least one hydraulically formed radially inwardly extending ridge on said shaft engaging surface bonded to and extending over said projection on either side of the innermost edge thereof, said ridge being hydraulically formed simultaneously with said liner being formed and said projection being molded.*

*18. A shaft seal comprising an annular elastomeric body having an axially inwardly extending flex portion with at least one molded projection extending radially inwardly therefrom to a terminal end portion, at least said flex portion of said elastomeric body having bonded thereto a hydraulically formed liner of uniform thickness of sintered polytetrafluoroethylene, said liner having a shaft engaging surface and including at least one hydraulically formed radially inwardly extending ridge on said shaft engaging surface bonded to and extending over and on both sides of the terminal end portion of said molded projection, said ridge in said liner being hydraulically formed simultaneously with said elastomeric body being molded and being bonded to said liner.*

*19. The shaft seal according to claim 18, wherein said shaft seal is of the molded lip type, and wherein said elastomeric body includes a molded lip and wherein said at least one ridge includes a ridge bonded to and formed over said molded lip so as to extend on each axial side of said molded lip.*

*20. The shaft seal according to claim 19 wherein said liner covers said body for at least 0.060 inch on each axial side of said molded lip.*

*21. A shaft seal comprising a molded elastomeric body, said elastomeric body having an annular heel portion and an annular flex portion extending axially inwardly from a radially inner portion of said heel portion and a hydraulically formed sintered polytetrafluoroethylene liner bonded onto a radially inner surface of said annular flex portion, said liner having been hydraulically formed from a ring of sintered polytetrafluoroethylene and bonded to said inner surface of the flex portion by molding of said elastomeric body, wherein said liner is provided with a plurality of hydrodynamic pumping elements, said hydrodynamic pumping elements projecting radially inwardly from a shaft-engaging surface of said liner and having been hydraulically formed into the sintered polytetrafluoroethylene liner by the deformation of the ring into pumping element shaped recesses due to the molding of said elastomeric body.*

*22. A shaft seal according to claim 21, wherein said radially projecting hydrodynamic pumping elements formed by deformation of the sintered polytetrafluoroethylene ring are of a projecting wedge-like shape.*

* * * * *